(12) United States Patent
Del Principe

(10) Patent No.: US 7,476,986 B1
(45) Date of Patent: Jan. 13, 2009

(54) WAVE-ACTION ENERGY PRODUCING APPARATUS

(76) Inventor: David M. Del Principe, 920 W. Swartzell Dr., Rensselaer, IN (US) 47978

( * ) Notice: Subject to any disclaimer, the term of this patent is extended or adjusted under 35 U.S.C. 154(b) by 183 days.

(21) Appl. No.: 11/499,922

(22) Filed: Aug. 7, 2006

(51) Int. Cl.
F03B 13/10 (2006.01)
F03B 13/12 (2006.01)
H02P 9/04 (2006.01)

(52) U.S. Cl. .......................................... 290/53; 290/42
(58) Field of Classification Search .................. 290/42, 290/43, 53, 54; 415/7; 60/498, 497, 501, 60/398; 416/7, 85
See application file for complete search history.

(56) References Cited

U.S. PATENT DOCUMENTS

| 163,451 | A | * | 5/1875 | Buckner, Jr. ................ | 60/502 |
| 987,685 | A | * | 3/1911 | Atkinson ..................... | 60/507 |
| 1,393,472 | A | * | 10/1921 | Williams ..................... | 290/42 |
| 1,864,499 | A | * | 6/1932 | Grigsby ....................... | 74/130 |
| 3,151,564 | A | * | 10/1964 | Rosenberg .................. | 60/499 |
| 3,567,953 | A | * | 3/1971 | Lord ............................. | 290/42 |
| 3,746,875 | A | * | 7/1973 | Donatelli ..................... | 290/42 |
| 3,851,476 | A | * | 12/1974 | Edwards ..................... | 405/25 |
| 3,930,168 | A | * | 12/1975 | Tornabene ................... | 290/53 |
| 4,009,395 | A | * | 2/1977 | Long et al. .................. | 290/53 |
| 4,034,231 | A | | 7/1977 | Conn et al. | |
| 4,145,885 | A | * | 3/1979 | Solell ........................... | 60/504 |
| 4,281,257 | A | * | 7/1981 | Testa et al. ................... | 290/42 |
| 4,341,074 | A | | 7/1982 | French | |
| 4,384,456 | A | * | 5/1983 | Boros .......................... | 60/499 |
| 4,392,060 | A | * | 7/1983 | Ivy ............................... | 290/53 |
| 4,448,020 | A | | 5/1984 | Wood et al. | |
| 4,490,621 | A | | 12/1984 | Watabe et al. | |
| 4,599,858 | A | * | 7/1986 | La Stella et al. .............. | 60/497 |
| 4,627,240 | A | * | 12/1986 | Holmes ....................... | 60/507 |
| 4,672,222 | A | | 6/1987 | Ames | |
| 5,094,595 | A | | 3/1992 | Labrador | |
| 5,708,305 | A | | 1/1998 | Wolfe | |
| 5,808,368 | A | * | 9/1998 | Brown ......................... | 290/53 |
| 5,929,531 | A | * | 7/1999 | Lagno .......................... | 290/53 |
| 6,184,590 | B1 | * | 2/2001 | Lopez .......................... | 290/53 |
| 6,756,695 | B2 | * | 6/2004 | Hibbs et al. ................... | 290/42 |

(Continued)

FOREIGN PATENT DOCUMENTS

GB 2037899 A * 7/1980

(Continued)

Primary Examiner—Julio Gonzalez
(74) Attorney, Agent, or Firm—Woodard, Emhardt, Moriarty, McNett & Henry LLP

(57) ABSTRACT

Apparatus is disclosed for generating electrical energy from mechanical energy in the form of liquid-propagated waves, such as ocean waves. In certain embodiments, a panel is connected to a shaft that has holes, and a set of gears is connected to the shaft so that the teeth of the gears mesh with the holes. The gears are connected directly or indirectly to the rotor of electric current generator(s). A return mechanism in the form of two magnets, at least one of which may be an electromagnet, is also provided. As waves strike the panel, the panel and shaft are driven in a direction, forcing the gears to rotate. The rotational motion of the gears drives the generator (s) rotor(s). When the shaft is driven to a predetermined extent, the at least one electromagnet is activated to return the shaft and panel in an opposite direction to a starting position.

22 Claims, 4 Drawing Sheets

U.S. PATENT DOCUMENTS

| | | | |
|---|---|---|---|
| 7,131,269 B2 * | 11/2006 | Koivusaari | 60/495 |
| 7,141,888 B2 * | 11/2006 | Sabol et al. | 290/53 |
| 7,164,212 B2 * | 1/2007 | Leijon et al. | 290/42 |
| 2006/0028026 A1 * | 2/2006 | Yim | 290/53 |
| 2008/0054640 A1 * | 3/2008 | Olson | 290/42 |

FOREIGN PATENT DOCUMENTS

| | | | |
|---|---|---|---|
| JP | 58096180 A | * | 6/1983 |

* cited by examiner

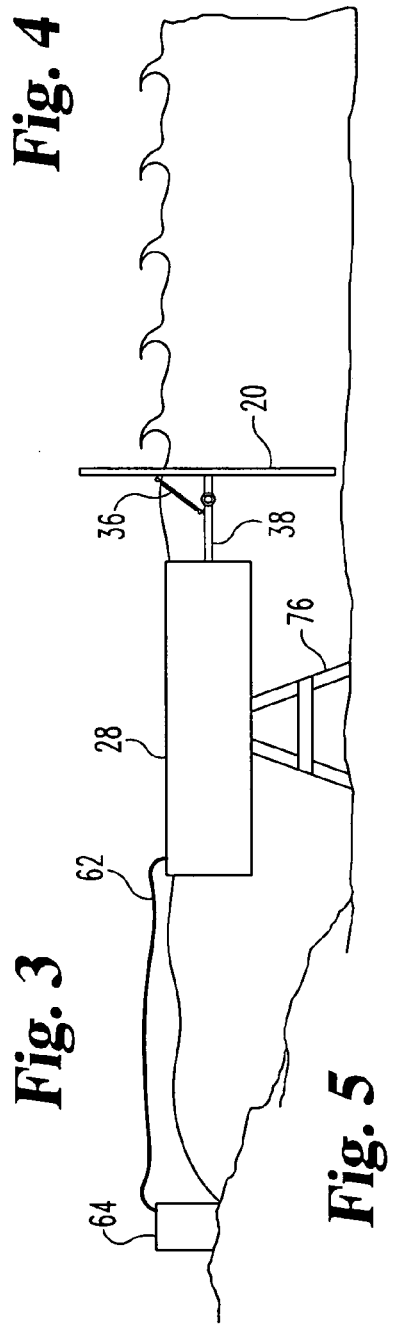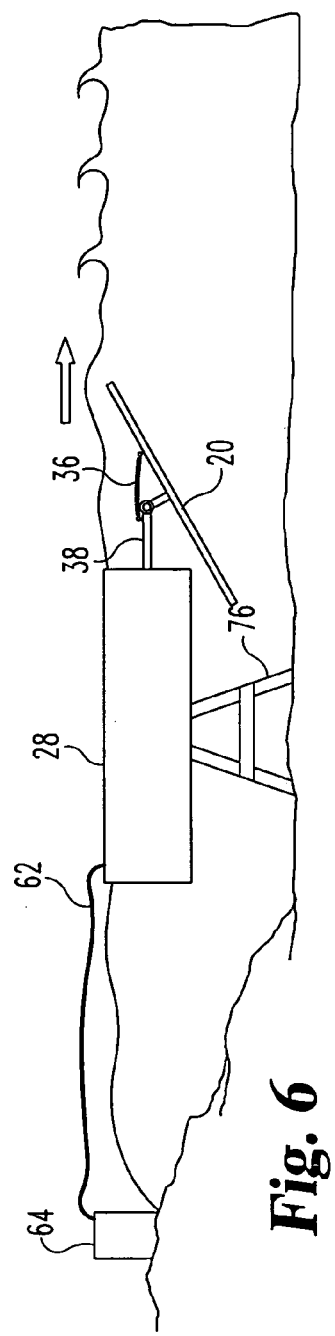

WAVE-ACTION ENERGY PRODUCING APPARATUS

The present disclosure concerns conversion of mechanical wave energy, such as from ocean waves, into electrical energy.

There has been significant interest in creating and/or developing sources of energy that are renewable and safe. Wind, solar, and hydroelectric solutions have been suggested, and each provides some measure of useful energy. However, there are some disadvantages to each as well. For example, solar technology is not always available due to clouds or other obscurers of the sun. Similarly, wind is not always available at speeds needed to efficiently run windmills and there is dissatisfaction in some quarters with the windmill's aesthetic effect and/or possible deleterious effects on animals or ecosystems. Hydroelectric power developed from river dams has also been questioned as to possible deleterious effects on organisms that live in or use such rivers.

Oceans or other deep-water bodies, of course, are media for generally consistent wave action, generated usually by wind, tidal or other forces. While such waves may vary in amplitude, they are almost always present, and generally rise in amplitude as they approach shore. Such consistent wave action represents a significant amount of mechanical energy passed through the water medium. Devices and methods for converting that mechanical wave energy into useful energy forms are needed.

An apparatus is provided for converting wave energy propagated in liquids into electrical energy, having a housing and a shaft with a relatively forward portion at least partially extending from said housing and a relatively rearward portion within said housing and an outer surface with a set of spaced apertures along that surface. A panel with a surface area is connected to the relatively forward shaft portion outside said housing so that the panel may rotate with respect to said shaft, the panel being adapted to be placed in a liquid through which waves propagate so that waves strike the panel. A set of gears are attached inside the housing, each having teeth adapted to fit into the spaced apertures in a rack-and-pinion relationship and a respective axle that extends therefrom. At least one electrical generator having a rotor connected to or a part of at least one of the axles is also provided, wherein movement of the panel toward the housing causes the shaft to move relative to the housing, so that the shaft causes the gear(s) to rotate, thus rotating the rotor to generate electrical energy.

In certain embodiments, the set of gears and the apertures may be substantially linear in alignment. An apparatus could further include at least one additional set of gears and at least one additional set of spaced apertures, each gear of the additional set(s) having teeth adapted to fit into the spaced apertures of the additional set(s) in a rack-and-pinion relationship, and each gear of the additional set(s) having a respective axle that extends therefrom. The shaft may have at least one substantially straight flat surface along substantially its entire length, and the set of apertures may be along the flat surface. In particular embodiments, the shaft may be substantially square in cross-section, having four substantially straight flat surfaces along substantially its entire length. In such cases, the set of apertures is along one of the flat surfaces, and three additional sets of apertures are along each of the remaining flat surfaces. Three additional sets of gears with teeth adapted to fit into the spaced apertures of respective additional sets of apertures in a rack-and-pinion relationship can be provided, with each gear of the additional sets having a respective axle that extends therefrom. In some other embodiments, the shaft may be substantially octagonal in cross-section, having eight substantially straight flat surfaces along substantially its entire length. One set of apertures can be along one of the flat surfaces, and at least three additional sets of apertures can be along respective ones of the remaining flat surfaces, and at least three additional sets of gears with teeth adapted to fit into said spaced apertures of respective additional sets of apertures in a rack-and-pinion relationship, with each gear of the additional sets having a respective axle that extends therefrom, can also be provided.

In certain embodiments, the apparatus can include first and second magnets of the same polarity, the first magnet being an electromagnet attached to the inside of the housing, and the second magnet attached to the shaft, wherein energizing the electromagnet repels the second magnet, pushing the shaft toward a forward portion of the housing. A pulse switch can be provided in the housing, which is activated by contact from a portion of the shaft, whereby activating the switch energizes the electromagnet.

Embodiments of the apparatus may have a generator located inside or outside of the housing. One or more arms that are adapted to transmit rotational motion may be connected between at least one of the gear axles and a generator, e.g. if the generator is relatively distant from the housing. A generator may be onshore, and the housing may be anchored to a part of ocean bed.

In some embodiments, an apparatus may include an energy storage device connected to the at least one generator, which may include at least one of a battery and a capacitor. The energy storage device can be onshore, and the at least one generator can be in the housing, with the housing anchored to a part of ocean bed. In ocean embodiments, the shaft can be linear, and at least part of the housing can be submerged in seawater. Additionally, substantially all of the panel may be submerged in seawater.

BRIEF DESCRIPTION OF THE DRAWINGS

FIG. 3 is an end view of another embodiment of the shaft of FIG. 2.

FIG. 4 is an end view of another embodiment of the shaft of FIG. 2.

FIG. 5 is a side view of an embodiment of an apparatus according to the present disclosure at one stage of operation.

FIG. 6 is a side view of an embodiment of an apparatus according to the present disclosure at another stage of operation.

DESCRIPTION OF THE ILLUSTRATED EMBODIMENTS

Figure 1:
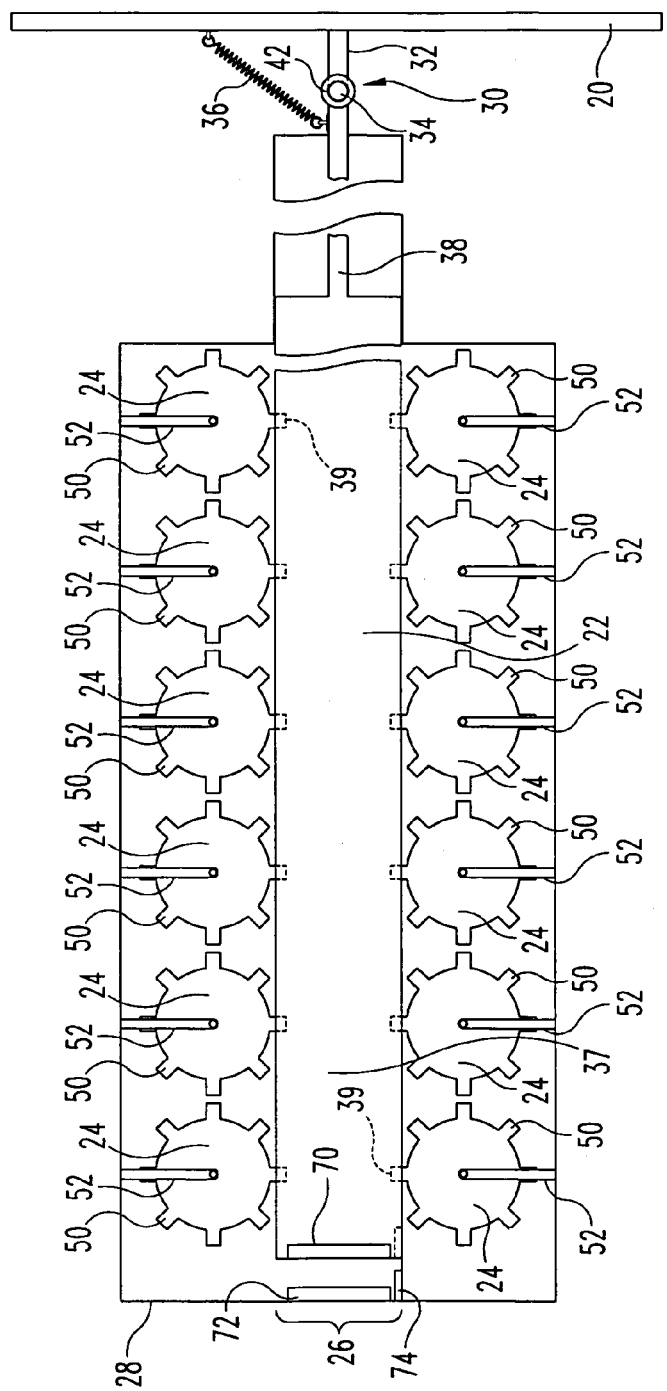
FIG. 1 is a partial cross-sectional view of an embodiment of an apparatus according to the present disclosure.

For the purpose of promoting an understanding of the principles of the disclosure, reference will now be made to the embodiments illustrated in the drawings and specific language will be used to describe the same. It will nevertheless be understood that no limitation of the scope of the claims is thereby intended, such alterations and further modifications in the illustrated device, and such further applications of the principles of the disclosure as illustrated herein as would normally occur to one skilled in the art to which the invention relates, are contemplated as within the scope of the claims.

Referring now generally to the drawings, there is shown an embodiment of a system for obtaining energy from water waves. In general, the embodiment includes a panel 20, a shaft 22, a series of gears 24, and a return mechanism 26. Gears 24 and return mechanism 26 are within a housing 28, as is most of shaft 22. As further described below, panel 20 is connected to shaft 22, and gears 24 are operably connected to shaft 22, so that linear movement of shaft 22 causes gears 24 to rotate. The rotation of gears 24 is used directly or indirectly to generate electrical power.

Panel 20, in the illustrated embodiment, is a generally square or rectangular flat piece, although it will be seen that other shapes of panel 20 may also be used. Panel 20 may be made of a relatively lightweight but sturdy material, such as aluminum or certain hard plastics, so as to be relatively easily moved but not easily damaged by waves. In other embodiments, other metals such as stainless steel or other sturdy materials may be used for panel 20. For uses in a salt-water environment, panel 20 and other parts discussed herein can be made of materials that are corrosion-resistant. Panel 20 is designed so as to present a relatively large surface area that will be acted upon and moved by waves (e.g. water waves).

A connecting link 30 is fixed at approximately the center of panel 20 in this embodiment. Connecting link 30, in this embodiment, is substantially T-shaped, with a stem 32 and a crossbar 34. Connecting link 30 is connected to shaft 22, as further described below, so that panel 20 can pivot at least partly substantially around a central longitudinal axis through crossbar 34. Link 30 or its parts may be made integrally with each other and/or with panel 20, or may be made separately and later joined to each other and/or panel 20 by mechanical attachment, welding, or as otherwise appropriate. A spring 36 is connected, directly (as in FIG. 1 or indirectly) between panel 20 and shaft 22, so as to bias panel 20 to a position where panel 20 is substantially perpendicular to shaft 22 and at least partially facing the direction of travel of waves.

Figure 2:
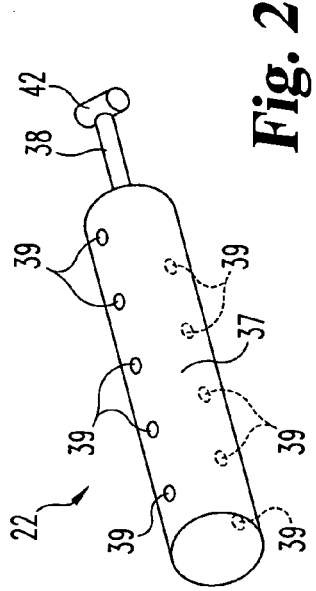
FIG. 2 is a perspective view of a shaft of the embodiment of FIG. 1.

In the illustrated embodiments, shaft 22 has a rearward portion 37 and a forward portion 38. Rearward portion 37 may be hollow (to reduce weight) or solid, and has a series of holes 39 spaced along one or more sides, which are spaced and sized to accommodate the teeth of gears 24. Shaft 22 may be substantially cylindrical, and may have a cross-section in the form of a circle, oval, or a regular polygon (e.g. a square, hexagon or octagon), among other shapes. The embodiment of FIG. 2 shows a shaft with a substantially circular cross-section, while the embodiments of FIGS. 3 and 4 show respectively a substantially square and a substantially octagonal cross-section. In embodiments in which flat surfaces or sides 40 are placed on shaft 22, holes 39 may be placed along such sides 40. Such flat sides 40 may extend along a substantial portion of the length of shaft 22.

Forward portion 38 extends from portion 37, and includes a collar 42 for connecting to link 30 of panel 20. Collar 42 is substantially cylindrical in the illustrated embodiment, having a through hole 44 and a central bottom-directed slot 46. Crossbar 34 extends through hole 44, and in a particular embodiment the diameters of crossbar 34 and hole 44 are similar enough so that crossbar 34 can turn within hole 44 without a great deal of wobble or play between crossbar 34 and collar 42. In certain embodiments, one or more sleeve bearings (not shown) may be placed in or be a part of collar 42 and/or crossbar 34 so as to reduce wobble while preserving pivotability of crossbar 34 within collar 42. Slot 46 is of a width that will permit stem 32 of link 30 to move through it when crossbar 34 rotates within collar 42. Collar 42 may be made integrally with portion 38 of shaft 22, or may be separately made and later assembled to shaft 22 and locked mechanically, by welding, or as otherwise appropriate.

Gears 24 are substantially round in this embodiment and include a plurality of teeth 50 about their respective circumferences. Eight teeth 50 are shown on each gear 24 in the illustrated embodiment, but it will be understood that other numbers of teeth 50 may be provided. As indicated previously, gears 24 and shaft 22 are manufactured so that holes 39 and teeth 50 are compatible with each other, and linear motion of shaft 22 causes the edges of holes 39 to push teeth 50 and rotate gears 24. Gears 24 are connected to housing 28 so that each gear 24 has at least one tooth 50 at least partially within a hole 39 of shaft 22. In the illustrated embodiment, each gear 24 is rotatably connected to a support or holder arm 52 that is in turn attached to housing 28.

The embodiment shown in FIG. 1 shows two sets of gears 24, one generally atop shaft 22 and one diametrically opposed to the first set adjacent the bottom of shaft 22. It will be seen that third, fourth, and/or additional sets of gears 24 could be placed adjacent shaft 22, and in particular each set of gears 24 could be made of substantially aligned gears 24, and the sets can be regularly or otherwise spaced around shaft 22. As seen in FIG. 3, for example, four sets of gears 24 are shown substantially equiangularly spaced around shaft 22, while FIG. 4 shows eight sets of gears 24 (with teeth not shown for the sake of keeping the drawing uncluttered) substantially equiangularly spaced around shaft 22.

Figure 7:
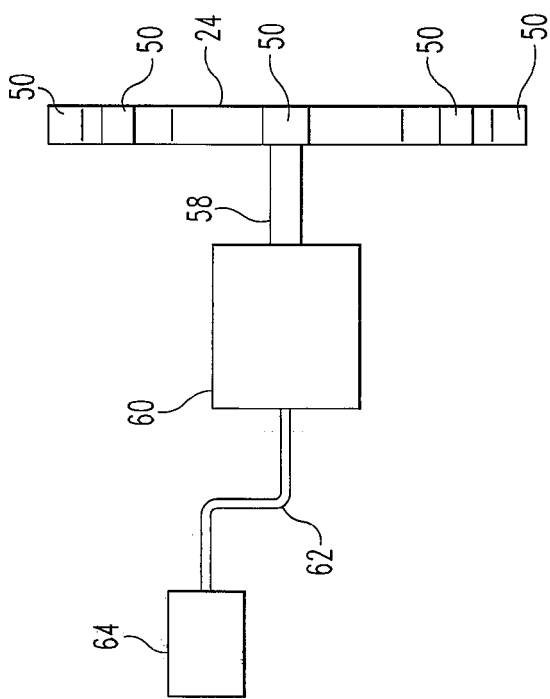

In one embodiment, gears 24 form part of, or are rigidly connected to, a rotor portion of a generator 60. FIG. 7 demonstrates schematically an axle 58 connected to gear 24 and extending into a generator 60. In that case, axle 58 or a piece connected to it can have wire(s) or a wire coil on it that turns with axle 58 to generate current, which current can run along conductor 62 to a collector 64. Collector 64 may be a battery, capacitor or other electrical energy storage device, or may be an electrical distribution or usage system. Collector 64 may be relatively distant from housing 28, e.g. onshore, and thus conductor 62 will extend through housing 28 and run to collector 64. Of course, in this embodiment, each gear 24 may be a part of a separate generator 60, and the conductors 62 that carry the output of each generator 60 may be joined together to form a single conductor that extends to collector 64, or each separate conductor 62 may be individually connected to a separate collector 64. As is well-known, collector 64 can collect energy until a suitable time or energy level is reached, and may be discharged or otherwise used to provide electrical energy where needed.

Figure 8:
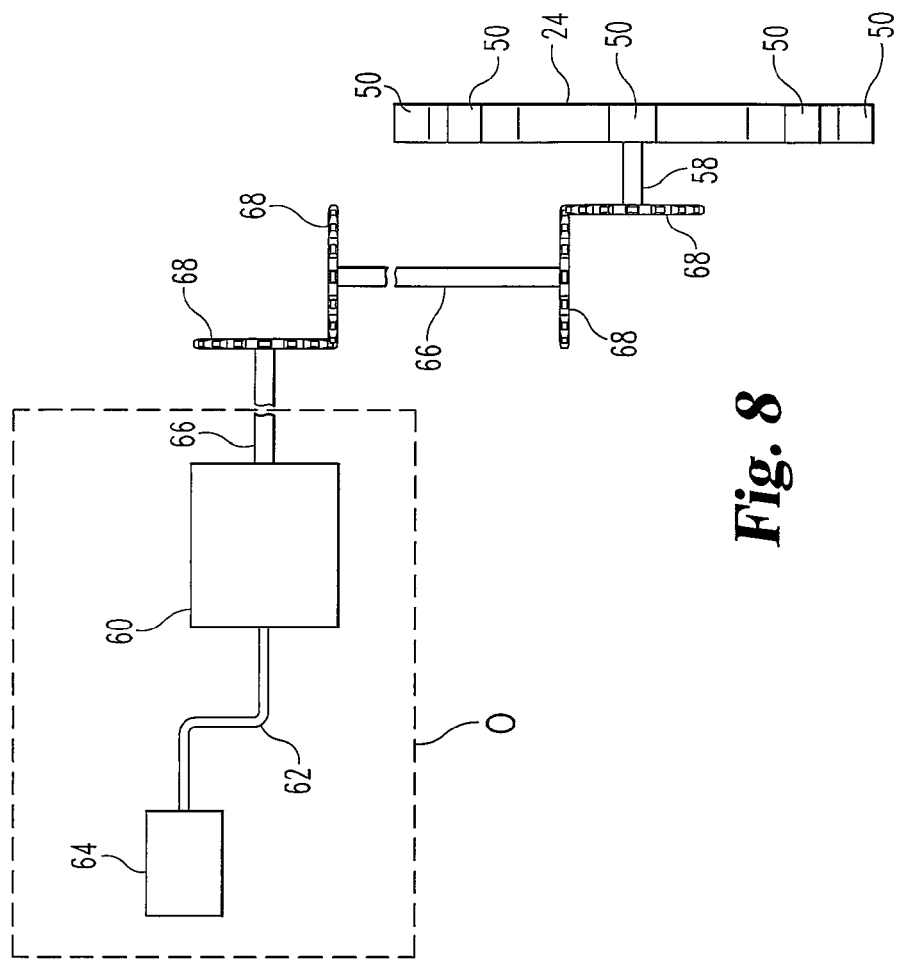
FIGS. 7 and 8 are side schematic views of embodiments of power generating and storing features of embodiments according to the present disclosure.

If a gear 24 is connected to a generator rotor located away from housing 28, then an arm, or segments connected by joints such as universal joints or beveled gears, may connect a gear 24 with a rotor (see, e.g., FIG. 8). Accordingly, when a gear 24 rotates, its rotational motion is transferred through rotating arms or segments 66 to a rotor of a generator 60, generating an electrical current. If present, arms or segment 66 may be connected via beveled gears 68, as indicated in one embodiment in FIG. 8. In this way, gears 24 may be mechanically connected to a generator rotor at a distance. As one example of a generator 60 being distant from or outside of housing 28. FIG. 8 indicates that generator 60 may be onshore, indicated schematically by box O in the Figure. As noted above, the output of generator 60 may be connected directly to an electrical distribution system, battery, capacitor or other device, shown schematically at 64, which also may be onshore as represented in FIG. 8.

At an end of shaft 22 opposite from panel 20, a return mechanism 26 is found. In this embodiment, return mechanism 26 includes a first magnet 70 attached to an end of shaft 22, and a second magnet 72, of the same polarity as the first magnet 70, and attached to housing 28. In a particular embodiment, at least second magnet 72 is an electromagnet, having little or no magnetic properties unless an electric current is applied. In that case, switch 74 may also be provided in housing 28, which closes a circuit, applying current to and activating magnet 72. Switch 74 is a pulse switch in one embodiment. When shaft 22 is pushed in by wave action sufficiently to approach the end of housing 28, shaft 22 contacts switch 74, closing the circuit and providing a pulse of current to magnet 72, and if magnet 70 is also an electromagnet, the circuit may provide a pulse to magnet 70 as well. When the pulse activates magnet 72, the like polarities of magnets 70 and 72 repels each other, forcing shaft 22 away from the end of housing 28. The characteristics of the current pulse (e.g. magnitude in amperes, duration, or other characteristics) and magnet 70 can be determined so that sufficient force is provided to send shaft 22 back to an original position, as further discussed below. Such an original position may be any position that allows shaft 22 to be pushed rearwardly by wave action on panel 20, and in one particular embodiment such a position may be one in which the end of shaft 22 having magnet 70 is adjacent the forwardmost gear(s) 24.

Housing 28 may be made of any material sufficiently sturdy to contain and support gears 24, shaft 22 and in appropriate embodiments generator(s) 60. In embodiments to be used in a salt-water environment, non-corrosive materials may be preferred for housing 28. Housing 28 may be substantially sealed against the intrusion of salt-water in such environments as well. Thus, since a portion of shaft 22 extends from a forward portion of housing 28, a seal or sealing system may be placed between forward portion 38 of shaft 22 and housing 28 so as to keep the entrance of salt to a minimum. Similarly, exit ports for conductor(s) 62 or arms or segments 66 that transfer rotational motion, and any access panels in housing 28 (as for maintenance purposes, for example) may be appropriately sealed. A stand, platform or support 76 can be provided, anchored to the shore or ocean floor, to hold housing 28. The same support or another separate stand or support (not shown) can support the extending portion of shaft 22 and panel 20.

The use of the system as described above will be discussed in context of ocean use near to or at a shoreline, although it may be placed in other liquids subjected to waves, or at some distance from shore in order to use substantial wave action. Panel 20 is at least partially in the ocean, and in an illustrated embodiment may have only a small portion above the mean water level, particularly at high tide. In embodiments in which forward portion 38 of shaft 22 is substantially linear, having panel 20 be substantially or entirely submerged may require housing 28 to be substantially or completely submerged as well. If forward portion 38 of shaft 22 has an angle or dog-leg in it, so that its connection point to panel 20 is significantly lower than its entry point into housing 28, then panel 20 may be substantially or completely submerged while housing 28 remains at or above a mean water level. Of course, in other embodiments more or most of panel 20 could be above the mean water level, particularly at low tide.

Panel 20 may be positioned so that it is substantially perpendicular to the direction of travel of ocean waves, or otherwise angled so that at least a component of the direction of travel of the ocean waves will be substantially perpendicular to panel 20. Shaft 22 is in toward the shore relative to panel 20, or may be essentially on-shore. As waves strike panel 20, at least some of the waves' energy is imparted to panel 20, tending to move it toward housing 28. As panel 20 moves, it pushes shaft 22 along its longitudinal axis, which causes gears 24 to turn. As gears 24 turn, electrical current is produced by generators 60 to which gears 24 are connected, and such energy is distributed or stored as discussed above.

Panel 20, shaft 22, and gears 24 (with connected generator(s) 60) continue to operate as noted above until shaft 22 approaches or contacts the end of housing 28 and closes pulse switch 74. When switch 74 is closed, a pulse of electric current activates one or both of magnets 72 and 70, as indicated above. Magnet 70 is repelled from magnet 72 and housing 28, and shaft 22 is pushed in a direction toward panel 20. The magnetic force generated by the pulse should be sufficient to push shaft 22 out a distance so that magnets 70 and 72 are at a distance from each other, and so that shaft 22 can resume moving inward with respect to housing 28 as waves strike panel 20. As noted above, the force may be sufficient to move shaft 22 such that magnet 72 is near forwardmost gear(s) 24. The repelling force causes gears 24 to rotate unless a mechanism is provided to move gears 24 slightly away from shaft 22 as shaft 22 moves outward. During such reversed rotation of gears 24, an electrical or mechanical disruption between gears 24 and generator(s) 60, or between generator(s) 60 and collector(s) 64, can be arranged to lessen the resistance to moving shaft 22 outward.

Figure 9:
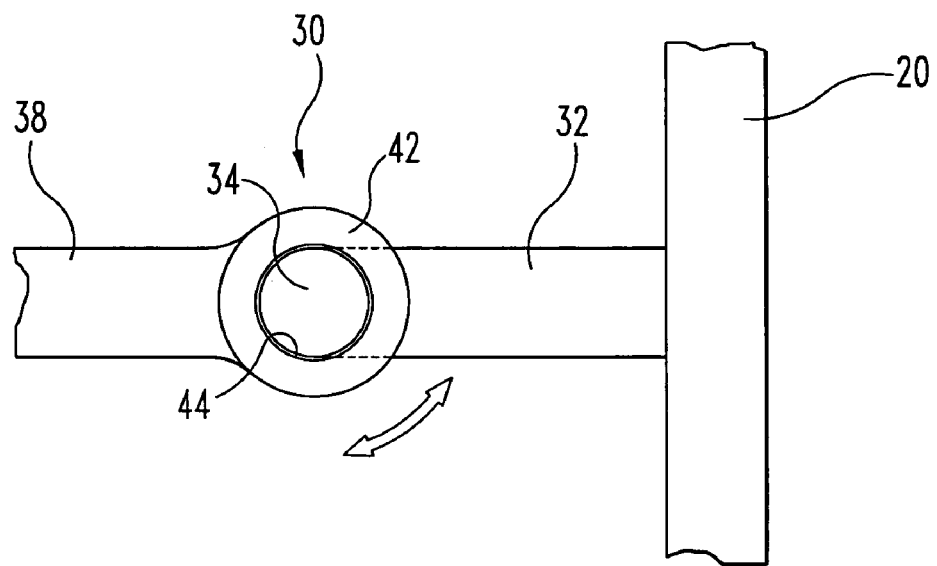
FIG. 9 is a side view of an embodiment of a connection between aspects of the apparatus embodiment of FIG. 1.
Figure 10:
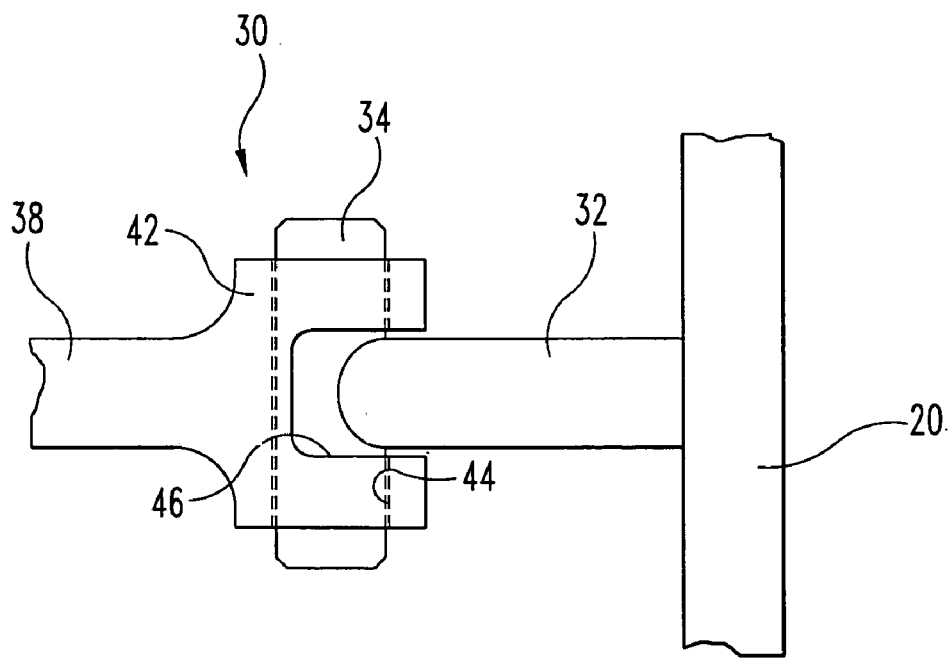
FIG. 10 is a bottom view of the embodiment shown in FIG. 9.

When shaft 22 is being pushed outward, panel 20 pivots around a central longitudinal axis through crossbar 34 (e.g. arrows in FIG. 9), so that panel 20 presents a relatively thin edge or small surface in or above the water. Accordingly, panel 20 is relatively easy to be forced outward, compared to the force that would be required to push it through the water with its entire surface area pushing against the water. When shaft 22 has been pushed out, spring 36 causes panel 20 to pivot around the central longitudinal axis of crossbar 34 until the pivoting is stopped by collar 42. The apparatus is thus reset, and further wave action can strike panel 20 to push it and shaft 22 inward, continuing the process of generating current as discussed above.

It will be understood that certain plastics or other lightweight materials may be ideal for use in all or part of shaft 22, gears 24 and panel 20. Plastic materials have the advantage of being resistant to salt corrosion, and the lighter the materials used for shaft 22, gears 24 and panel 20, the less force will be required to reset the apparatus after wave action has pushed panel 20 and shaft 22 in. Nevertheless, a variety of materials can be used for the parts described above.

While the invention has been illustrated and described in detail in the drawings and foregoing description, the same is to be considered as illustrative and not restrictive in character, it being understood that only selected embodiments have been shown and described and that all changes, modifications and equivalents that come within the spirit of the inventions described heretofore and/or defined by the following claims are desired to be protected.

What is claimed is:

1. An apparatus for converting wave energy propagated in liquids into electrical energy, comprising:
   a housing;
   a shaft, said shaft having a relatively forward portion at least partially extending from said housing, and a relatively rearward portion within said housing and having an outer surface, a set of spaced apertures being along said outer surface;
   a panel connected to said relatively forward shaft portion outside said housing so that said panel may rotate with respect to said shaft, said panel having a surface area, said panel adapted to be placed in a liquid through which waves propagate so that waves strike said panel;

a set of gears attached inside said housing, each gear of the set having teeth adapted to fit into said spaced apertures in a rack-and-pinion relationship, and each gear of the set having a respective axle that extends therefrom;

at least one electrical generator having a rotor, said rotor being connected to or a part of at least one of said axles; and wherein movement of said panel toward said housing causes said shaft to move relative to said housing, so that said shaft causes each gear of said set of gears to rotate, thus rotating said rotor to generate electrical energy.

2. The apparatus of claim 1, wherein said set of gears and said apertures are substantially linear in alignment.

3. The apparatus of claim 1, further comprising at least one additional set of gears and at least one additional set of spaced apertures, each gear of said at least one additional set having teeth adapted to fit into said spaced apertures of said at least one additional set in a rack-and-pinion relationship, and each gear of said one additional set having a respective axle that extends therefrom.

4. The apparatus of claim 1, wherein said shaft has at least one substantially straight flat surface along substantially its entire length.

5. The apparatus of claim 4, wherein said set of apertures is along said flat surface.

6. The apparatus of claim 4, wherein said shaft is substantially square in cross-section, having four substantially straight flat surfaces along substantially its entire length.

7. The apparatus of claim 6, wherein said set of apertures is along one of said flat surfaces, and further comprising three additional sets of apertures, one of said additional sets of apertures along each of the remaining flat surfaces, and further comprising three additional sets of gears, each gear of said respective additional sets having teeth adapted to fit into said spaced apertures of a respective additional set of apertures in a rack-and-pinion relationship, and each gear of said additional sets having a respective axle that extends therefrom.

8. The apparatus of claim 4, wherein said shaft is substantially octagonal in cross-section, having eight substantially straight flat surfaces along substantially its entire length.

9. The apparatus of claim 6, wherein said set of apertures is along one of said flat surfaces, and further comprising at least three additional sets of apertures, one of said additional sets of apertures along a respective one of the remaining flat surfaces, and further comprising at least three additional sets of gears, each gear of said respective additional sets having teeth adapted to fit into said spaced apertures of a respective additional set of apertures in a rack-and-pinion relationship, and each gear of said additional sets having a respective axle that extends therefrom.

10. The apparatus of claim 1, further comprising first and second magnets of the same polarity, said first magnet being an electromagnet attached to the inside of said housing, and said second magnet attached to said shaft, wherein energizing said electromagnet repels said second magnet, pushing said shaft toward a forward portion of said housing.

11. The apparatus of claim 1, wherein said generator is located inside the housing.

12. The apparatus of claim 1, wherein said generator is located outside the housing.

13. The apparatus of claim 12, further comprising one or more arms adapted to transmit rotational motion are connected between at least one of said axles and said at least one generator.

14. The apparatus of claim 12, wherein said at least one generator is onshore, and said housing is anchored to a part of ocean bed.

15. The apparatus of claim 1, further comprising an energy storage device connected to said at least one generator.

16. The apparatus of claim 15, wherein said device includes at least one of a battery and a capacitor.

17. The apparatus of claim 15, wherein said energy storage device is onshore, and said at least one generator is in said housing and said housing is anchored to a part of ocean bed.

18. The apparatus of claim 1, wherein said shaft is linear, and at least part of said housing is submerged in seawater.

19. The apparatus of claim 18, wherein substantially all of said panel is submerged in seawater.

20. The apparatus of claim 1, wherein said panel is spring-biased toward a first position in which said panel is substantially perpendicular to said shaft, said panel having a second position in which said panel is substantially parallel to said shaft, and wherein movement of said panel away from said housing causes said panel to rotate with respect to said shaft toward said second position, against the spring-bias.

21. The apparatus of claim 1, wherein said apparatus is placed in a body of liquid through which waves propagate in a direction of propagation, and said shaft is parallel to the direction of propagation.

22. An apparatus for converting wave energy propagated in liquids into electrical energy, comprising:

a housing;

a shaft, said shaft having a relatively forward portion at least partially extending from said housing, and a relatively rearward portion within said housing and having an outer surface, a set of spaced apertures being along said outer surface;

a panel connected to said relatively forward shaft portion outside said housing so that said panel may rotate with respect to said shaft, said panel having a surface area, said panel adapted to be placed in a liquid through which waves propagate so that waves strike said panel;

a set of gears attached inside said housing, each gear of the set having teeth adapted to fit into said spaced apertures in a rack-and-pinion relationship, and each gear of the set having a respective axle that extends therefrom;

at least one electrical generator having a rotor, said rotor being connected to or a part of at least one of said axles; and wherein movement of said panel toward said housing causes said shaft to move relative to said housing, so that said shaft causes each gear of said set of gears to rotate, thus rotating said rotor to generate electrical energy;

further comprising first and second magnets of the same polarity, said first magnet being an electromagnet attached to the inside of said housing, and said second magnet attached to said shaft, wherein energizing said electromagnet repels said second magnet, pushing said shaft toward a forward portion of said housing, and further comprising a switch in said housing, said switch being a pulse switch activated by contact from a portion of said shaft, whereby activating said switch energizes said electromagnet.

* * * * *